Oct. 19, 1954
E. A. HUNTER ET AL
2,692,239
PROCESS OF PREPARING A MAGNESIA HYDROSOL
AND MAGNESIA HYDROGEL
Filed June 18, 1949
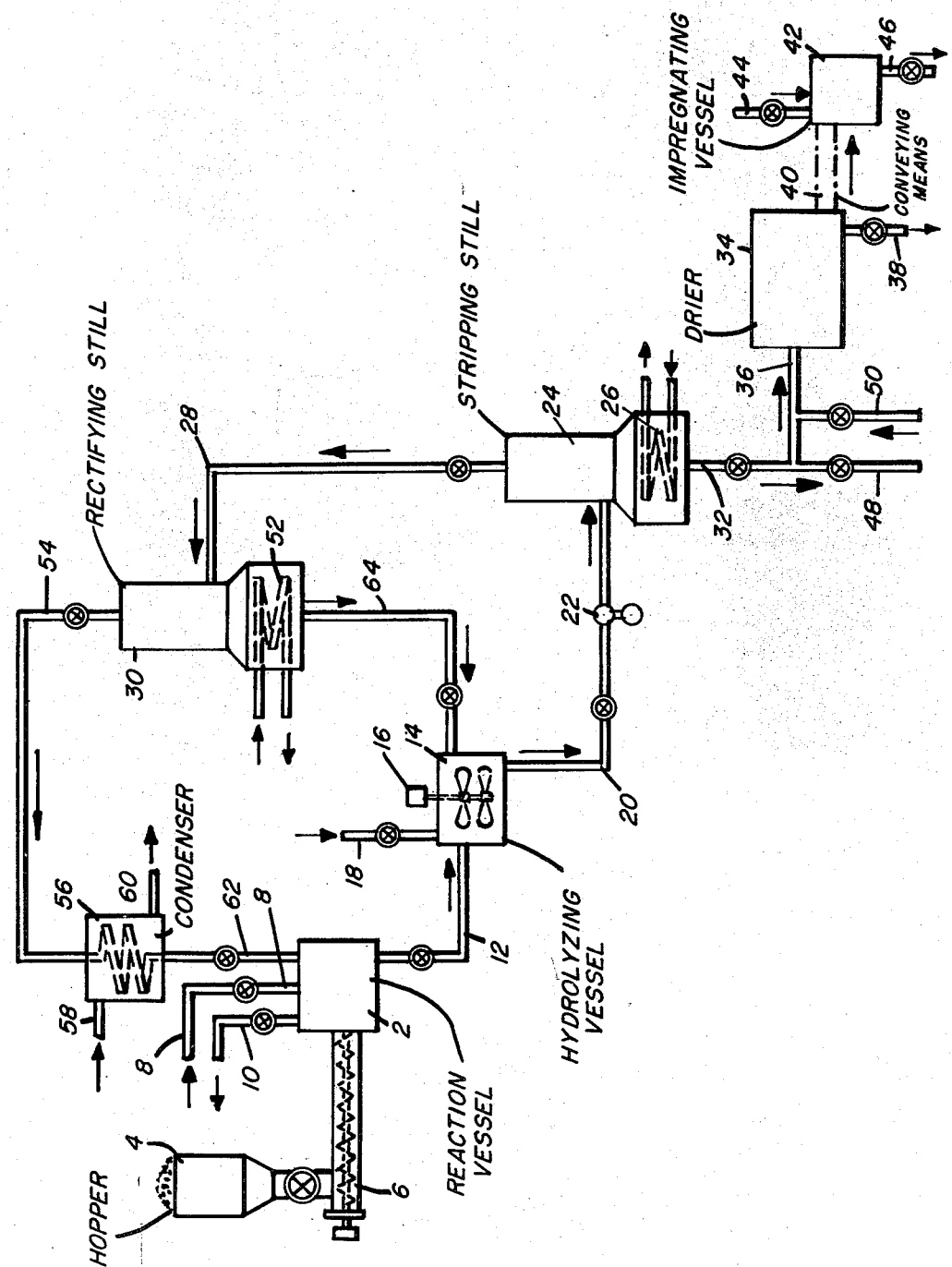
Edward A. Hunter, Inventors
Charles N. Kimberlin, Jr.
By Paul O. Dunham Attorney Patented Oct. 19, 1954

2,692,239

UNITED STATES PATENT OFFICE 2,692,239

PROCESS OF PREPARING A MAGNESIA HYDROSOL AND MAGNESIA HYDROGEL

Edward A. Hunter and Charles N. Kimberlin, Jr., Baton Rouge, La., assignors to Standard Oil Development Company, a corporation of Delaware Application June 18, 1949, Serial No. 99,992

8 Claims. (Cl. 252—313)

This invention relates to a process for the preparation of catalytic and adsorbent materials and more particularly to a process for the preparation of magnesia and/or magnesia-containing catalysts and adsorbent materials.

The use of magnesia and magnesia-containing materials is well known. These substances may be made by the mixing of a powdered magnesium oxide which has been prepared by calcining magnesium carbonate with other materials such as silica, alumina, silica-alumina and the like.

It is the object of this invention to provide a new process for the preparation of magnesia and/or magnesia containing materials by hydrolysis of an alcoholate of magnesium. It is a further object of this invention to recover the regenerated alcohol from the hydrolysis step for reuse in the process.

It is a further object of the invention to provide a new process for the preparation of a magnesia gel of exceptional purity and a very high surface area.

It is a further object of this invention to prepare hydrosols of hydrous magnesia having higher concentrations of magnesia than the hydrosols of magnesia available heretofore.

It is further the object of the invention to provide a process for preparing true hydrogels of magnesia.

Factors which contribute to the commercial practicability of this invention include:

1. The low cost of magnesium metal as a source of magnesia;
2. The elimination of all necessity for washing;
3. The simplicity of the processing steps involved in the manufacture; and
4. A recycling step which insures substantially complete alcohol recovery.

The material prepared in accordance with this method is characterized by high purity and a very high surface area.

According to this invention, the alcohol used for the formation of the magnesium alcoholate is methyl alcohol. The alcohol must be essentially anhydrous and the commercial anhydrous methyl alcohol is satisfactory.

The formation of the alcoholate of magnesium using methyl alcohol as the reactant alcohol takes place in accordance with the following equation:

Equation I $$2CH_3OH + Mg \rightarrow Mg(OCH_3)_2 + H_2$$

The hydrogen is in the gaseous state and escapes from the reaction.

Upon hydrolysis in the presence of water the magnesium alcoholate undergoes the following change:

Equation II $$Mg(OCH_3)_2 + 2H_2O \rightarrow Mg(OH)_2 + 2CH_3OH$$

the reactant alcohol being reformed and going into solution with excess hydrolyzing medium from which it is recovered for reuse in the process.

In general, the invention involves reacting magnesium metal with methanol, under such conditions as to form a solution of magnesium methylate in excess methanol and hydrolyzing the resultant magnesium methylate by violent agitation with water to form a magnesia hydrosol.

This hydrolysis must be very carefully controlled, otherwise a precipitate of magnesia will be obtained rather than the desired hydrosol of magnesia. The desired result is accomplished by introducing the alcohol solution of magnesium methylate slowly, either in small increments or as a fine stream, into the vigorously agitated water. In this manner, the water is always in large excess as compared with the magnesium methylate being hydrolyzed. The addition of the magnesium methylate solution to the violently agitated water can be continued until the concentration of the resultant hydrosol, containing methanol, can be built up to as much as 3% magnesia without any evidence of precipitate formation.

The reason why this method of carefully hydrolyzing magnesium methylate results in a true hydrosol rather than the precipitate normally obtained is not known; however, the following hypothesis can be advanced. The hydrolysis of magnesium methylate may not be "instantaneous" but may require a finite period of time which is great enough to permit the magnesium methylate to be dispersed by the violent agitation into a very dilute solution in the water before actual hydrolysis has occurred to any appreciable extent. The nuclei of magnesia formed by hydrolysis of this very dilute solution of magnesium methylate might be so numerous that the individual particles could not grow beyond colloidal size even when subsequently building up the concentration of magnesia by further careful additions of magnesium methylate. Other hypotheses could also be advanced to explain this unexpected result.

After the hydrolysis the reaction products are introduced into a stripping still wherein the alcohol and a portion of the water present are stripped from the magnesia hydrosol and introduced into a rectifying still. In the rectifying still the alcohol is vaporized, taken overhead, condensed and used for reacting with more magnesium metal.

The separated water is taken from the bottom of the rectifying still and reintroduced into the hydrolysis zone.

The magnesia hydrosol is withdrawn from the bottom of the stripping still and may be dried to form a magnesium oxide gel. If desired, the magnesia hydrosol may be combined with other sols or metal salt solutions and treated to give mixtures of magnesium oxide with other catalytically active oxides.

If desired the magnesia hydrosol may be concentrated to as high as about 6% magnesia content by evaporation of water without any tendency to the formation of precipitates. So far as is known no true hydrosol of magnesia has been produced heretofore having a magnesia content above about 1%.

This hydrosol is a perfectly stable colloidal dispersion of hydrous magnesia, which shows no tendency for the magnesia to separate out upon long standing. The hydrosol is somewhat opalescent in appearance. It is transparent in moderately thin layers, the transparency depending upon the concentration. It has a pale blue cast by reflected light and is a light brown color by transmitted light. It shows a pronounced Tyndall effect.

Although the hydrosol is stable with regard to precipitation, upon long standing it sets to a rigid hydrogel. So far as is known this is the first preparation of a true hydrogel of magnesia. The time required for spontaneous setting to a hydrogel depends upon the concentration of magnesia; a 2.8% magnesia hydrogel requires about 8 weeks to set to a hydrogel, a 4.2% hydrosol sets in about 3 weeks, more concentrated hydrosols set in a shorter time. However, if it should be desired to convert the hydrosol rapidly into a hydrogel this can readily be done by adding certain reagents which will hasten the process. These include small amounts of certain weak acids such as carbonic acid, sulfurous acid, boric acid, etc., or alkaline materials such as ammonia or certain amines, or solutions of salts such as ammonium dichromate or ammonium molybdate, or dilute solutions of strong acids such as nitric acid, hydrochloric acid, sulphuric acid, or phosphoric acid. However, each such additive must be tested individually to determine its effectiveness in forming the hydrogel and to determine the optimum amount to use.

In general appearance the hydrogels closely resemble the hydrosols from which they are produced, except, of course, that they are not fluid. They are opalescent with a slight blue cast by reflected light and a light brown color by transmitted light. They are fairly transparent and show a marked Tyndall effect. They are quite rigid and appear to be entirely stable. When broken they show a conchoidal fracture.

The magnesia hydrosol is particularly well adapted to the production of magnesia in the form of microspheres by the following procedures:

1. By spraying the magnesia hydrosol into hot gases under suitable conditions to dry the droplets to magnesia microspheres;

2. By dispersing the magnesia hydrosol in a liquid-immiscible with water and if necessary, adding a setting agent such as ammonia, morpholine, pyridine, sulphurous acid, carbonic acid or the like to the medium to cause gelation of the droplets. Drying the hydrogel particles produces magnesia microspheres.

3. By dispersing a magnesia hydrosol in a liquid slightly miscible with water, such as n-butanol, and the like so that partial dehydration of the droplets takes place causing gelation. The hydrogel particles upon drying produce magnesia gel microspheres.

The drawing represents one form of an apparatus operable for carrying out one embodiment of the invention.

In the drawing, numeral 2 designates a reaction vessel. Magnesium metal in hopper 4 is fed into the reaction vessel 2 by means of screw conveyor 6. Other conveying means may be utilized, of course, and the invention is not limited to the screw conveyor shown.

Methyl alcohol is added to the reaction vessel 2 through line 8. The alcohol used for the reaction must be substantially anhydrous, the commercial anhydrous methanol being operable.

The metal and the added alcohol react in reaction vessel 2 to form a metallic alcoholate. This reaction proceeds in accordance with Equation I. Hydrogen formed and liberated by the reaction may be taken from reaction vessel 2 through line 10. The hydrogen produced is equivalent in purity to that produced electrolytically. It may be cooled and passed through a separator which strips from it any entrained liquid, the liquid being returned to reaction vessel 2 and the hydrogen filtered, compressed and stored by means of equipment not shown.

The reaction may be carried out in the presence of a promoter or catalyst such as a small amount of mercuric chloride, aluminum chloride, iodine and the like. Ordinarily no promoter is needed for the reaction proceeds to completion readily without one. The temperature in reaction vessel 2 will approximate the boiling point of the reactant methyl alcohol, or approximately 140° to 160° F.

Temperature controlling means such as a cooling coil, not shown, may be contained in reaction vessel 2 to control the rate of reaction and prevent the boiling up of the reactant alcohol. From reaction vessel 2, products of the reaction comprising a solution of magnesium alcoholate in excess alcohol are passed through line 12 and into vessel 14, which is equipped with a mixing or stirring means 16 such as a shaft driven propeller, or other device to produce the desired amount of agitation. Vessel 14 is equipped with a line 18 through which an aqueous medium, such as water, may be introduced.

Vessel 14 is filled with the aqueous medium and upon the addition of the solution of magnesium alcoholate the hydrolysis step takes place in accordance with Equation II. The agitation in vessel 14 should be sufficiently vigorous so that the mixing of the magnesium alcoholate with the water is completed practically instantaneously; in this manner the desired hydrosol of magnesia is obtained instead of an undesirable precipitate.

The temperature in vessel 14 is not critical; ordinarily the magnesium alcoholate solution entering by line 12 will be about 140–160° F., the water entering by line 18 will be about 40 to 90° F., and the recycle water (hereinafter described) entering by line 64 will be about 170 to 205° F., so that the final temperature in vessel 14 will be about 80 to 140° F. The time of residence in vessel 14 is also not critical; this may vary from a few seconds to several minutes or longer. The rate of addition of the solution of magnesium alcoholate through line 12 is so controlled and adjusted in relation to the rate of addition of water through line 18 and the rate of addition of recycle water through line 64 that the resulting hydrosol (containing alcohol) has the desired magnesia content of not greater than 4% and preferably not greater than 3% by weight.

Reaction products from vessel 14 are withdrawn by means of line 20 and pump 22 and introduced into stripping still 24. Heating means such as a steam coil 26 is provided in the bottom of stripping still 24. By means of this heating coil, the temperature of the lower section of the still is raised to one within a range of 205 to 215° F., preferably 212° F. At this temperature, substantially all of the alcohol admixed with some water is vaporized. These vapors pass upwardly and are withdrawn from stripping still 24 through line 28. Line 28 communicates with rectifying still 30 hereinafter to be described.

From the bottom of stripping still 24, the magnesia hydrosol is withdrawn through line 32.

If it is desired, magnesia hydrosol may be introduced into drier 34 by means of line 36. Here the hydrous magnesia is dried by being subjected to temperatures of 220° F. to 500° F. and may then be removed through line 38 as a magnesia gel. However, if it is desired to prepare a magnesia gel in combination with other catalytic components, the magnesia gel from vessel 34 may be withdrawn by a conveying means represented by 40 and introduced into impregnation chamber 42. The desired amount of a solution of the catalytic component is introduced into impregnation chamber 42, through line 44. After the desired period of impregnation, the excess solution and impregnated magnesia may be withdrawn through line 46 for further treatment.

If it is desired to form a magnesia gel in combination with other catalytic components by the impregnation of a magnesia hydrosol, this may be accomplished by withdrawing the magnesia hydrosol from stripping still 24 through lines 32 and 48. The impregnation may be accomplished by mixing with the magnesia hydrosol a solution of the desired catalytic component for the desired period of time in equipment not shown. For instance, when it is desired to add chromic oxide as the catalytic component, a solution of ammonium dichromate or chromic nitrate may be used; when molybdenum oxide is the desired catalytic component, a solution of ammonium molybdate may be used; ferric oxide may be added by using a solution of ferric nitrate; copper oxide may be added by using a solution of copper nitrate or copper acetate; aluminum nitrate solution will add aluminum oxide; cobalt oxide may be added by using a solution of cobalt nitrate or cobalt acetate; when it is desired to add nickel oxide, a solution of nickel nitrate or nickel acetate may be used; zirconium oxide may be added by using a solution of zirconia and acetate; potassium nitrate or potassium carbonate will add potassium oxide, cerium oxide may be added by using a solution of cerium nitrate. It is to be understood, of course, that the above are merely some examples of the components and impregnating solutions operable.

It is also possible to impregnate the hydrous magnesia in line 36. This may be done by mixing with the magnesia hydrosol in line 36, a solution of the desired catalytic component through line 50, sufficient mixing occurring within line 36 to bring about the desired impregnation. The impregnated magnesia is introduced into drying vessel 34 for the desired drying treatment.

If it is desired, a dried magnesia gel may be impregnated with various catalytic components in the dry form. To accomplish this, the dried magnesia from drier 34 is introduced into mixing means such as a ball mill or the like (not shown), through line 38. The desired catalytic component in powdered form is added to the mixing means and the milling is continued until the desired impregnation occurs. Dry powdered aluminum chloride or ferric chloride are two examples of catalytic components which may be added to the dried magnesia.

The mixture of alcohol and water vapors withdrawn from stripping still 24 through line 28 is introduced into rectifying still 30.

The temperature in the lower portion of still 30 is maintained within a range of 170 to 212° F., preferably 190 to 205° F.; the top of still 30 is maintained at a temperature within the range of 145 to 150° F., preferably 147 to 149° F.

This temperature is obtained by means of coil 52. At these temperatures, the alcohol vapors remain in the vaporous form and are withdrawn from rectifying still 30 through line 54. Line 54 communicates with condenser 56 which is equipped with an inlet at 58 and an outlet at 60 for a suitable cooling medium. Here the temperature of the alcohol vapors is lowered to one within a range of 80 to 130° F. and the alcohol vapors condense and pass through line 62 into reaction vessel 2.

The alcohol losses depending on the efficiency of operation would be in the order of 0.5% to 1.5% of the circulating alcohol stream. These alcohol losses are made up by the addition of make-up alcohol in reaction vessel 2 through line 8.

The water collects in the bottom of rectifying still 30 and is withdrawn through line 64 and introduced into the hydrolysis zone of reaction vessel 14.

The operation is continuous, the magnesium metal being continuously introduced into reaction vessel 2 and the make up alcohol being continuously introduced through line 8, the recycle features outlined and described contributing to the economy of the operation.

It is to be understood, of course, that if it is desired, the process may be operated according to a batch procedure.

The invention is further explained by the following examples:

*Example I*

384 grams of magnesium turnings are dissolved in 8 liters of anhydrous methanol, the following reaction taking place:

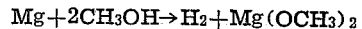
$$Mg + 2CH_3OH \rightarrow H_2 + Mg(OCH_3)_2$$

The resulting solution of magnesium methylate in methanol is fairly stable, but is believed to be supersaturated since on cooling or standing there is thrown down a precipitate of magnesium methylate which is extremely difficult to redissolve. Since this precipitate is deleterious to satisfactory hydrosol preparation it is necessary to process the solution before the deposit is formed.

The methanol solution of magnesium methylate is hydrolyzed by discharging in a thin stream into a cylindrical vessel 13″ in diameter and 16″ in depth which contains 16 liters of water (about 7½″ in the vessel). The vessel is equipped with two 5″ diameter three bladed marine type propellers maintained 4″ apart on a single shaft. Shaft enters the vessel at an angle from the top of the vessel and the lower propeller is approximately 3" from the bottom of the vessel. Rotation of the shaft is such that the propellers force liquid away from each other. The stirring is started and the methanol solution of magnesium methylate is added during the course of 20 minutes. A satisfactory hydrosol is obtained when the propellers are rotated at 1050 R. P. M. An unsatisfactory hydrosol, that is one which contains discrete particles of precipitated magnesia, is obtained when (1) the rate of stirring is reduced to 730 R. P. M. and the period for the addition of the alcoholate solution is maintained at 20 minutes or (2) when the rate of stirring is maintained at 1050 R. P. M. and the period for introducing the alcoholate solution is reduced to 10 minutes.

The hydrolysis occurring within the cylindrical vessel takes place according to the following equation:

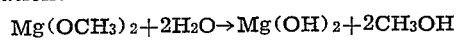

$$Mg(OCH_3)_2 + 2H_2O \rightarrow Mg(OH)_2 + 2CH_3OH$$

The product of this step is a magnesia hydrosol containing about 2.8 weight per cent MgO and about 28 weight per cent methanol.

The methanol present in the hydrosol is distilled off, increasing the MgO content of the hydrosol to about 3.9 weight per cent. The methanol taken overhead is then processed in a rectifying still and is recovered as anhydrous methanol suitable for recycling to react with additional magnesium.

The surface areas of samples of magnesia gel prepared by drying this magnesia hydrosol at 250° F. and low relative humidity have been evaluated by the Brunauer-Emmett-Teller nitrogen adsorption technique. Surface areas obtained were of the order of 250 square meters per gram.

*Example II*

Magnesia hydrosol prepared as in Example I was treated with a variety of acids, bases, and salts as setting agents. The following tabulation describes the effect of various reagents on the MgO hydrosol. Only "trace" quantities of the reagents are required. Accurate measurements of the amounts were not made; in the case of the liquid reagents 1 to 2 drops of reagent were added to 15 to 25 cc. of hydrosol; in the cases of $SO_2$ and $CO_2$ the gases were bubbled through the hydrosol for 5 to 10 seconds. Except in the cases of formic and acetic acids the hydrosols had set to hydrogels within less than five minutes.

| Reagent | Effect |
|---|---|
| $NH_3$ solution | Set to hydrogel. |
| Morpholine solution | Do. |
| $CO_2$ gaseous | Do. |
| $SO_2$ gaseous | Do. |
| $H_3BO_3$ solution | Do. |
| Acetic Acid | Precipated hydrous MgO. |
| Formic Acid | Do. |
| HCl solution | Set to hydrogel. |
| $HNO_3$ solution | Do. |
| $H_2SO_4$ solution | Do. |
| $H_3PO_4$ solution | Do. |
| $(NH_4)_2CrO_4$ solution | Do. |
| $(NH_4)_2MoO_4$ solution | Do. |

*Example III*

A sample of magnesia hydrosol prepared as in Example I, containing about 2.8 weight per cent MgO and about 28 weight per cent methanol, was stored in a sealed container at room temperature. At the end of about 8 weeks, this sol set to a true magnesia hydrogel, very similar in appearance to silica hydrogel.

A second sample of the same hydrosol, from which the methanol was removed by distillation and which had an MgO content of about 3.9 weight per cent, was stored under the same conditions. This sample set to a true MgO hydrogel in about 3 weeks.

Samples of hydrosol which have been still further concentrated by evaporation (up to about 6 weight percent MgO) set to hydrogels in still less time. For instance, a 6% magnesia hydrosol required approximately 4 days to set to a hydrogel.

The catalytic materials formed in the process of this invention are useful for many industrial processes. A specific instance is the improvement of the octane number of a naphtha fraction by hydroforming or aromatization with a catalyst comprising molybdenum oxide and magnesium oxide. This catalyst may be made according to the following example.

384 grams of magnesium turnings were dissolved in 8 liters of absolute methanol. The solution of magnesium methyl oxide was hydrolyzed by adding over a period of about 20 minutes to 16 liters of distilled water in an agitator as described above. A stable magnesia hydrosol resulted. This hydrosol was thereupon mixed with the solution of ammonium molybdate containing the equivalent of 72 grams of molybdenum oxide. A thick pasty hydrogel resulted. The hydrogel was dried and calcined to produce an active catalyst comprising 90 parts of magnesium oxide and 10 parts of molybdenum oxide.

What is claimed is:

1. A process for producing magnesia hydrosol which comprises hydrolyzing an anhydrous methanol solution of magnesium methylate with an excess of water in a mixing zone of violent agitation by adding said methanol solution of magnesium methylate slowly as a thin stream into an excess of water in said mixing zone while violently agitating the contents of said mixing zone and continuing the slow addition of the anhydrous methanol solution of magnesium methylate until a dilute stable magnesia hydrosol substantially free of discrete particles of precipitated magnesia and containing about 3% by weight of magnesia is formed and recovering the stable dilute magnesia hydrosol.

2. A process according to claim 1 wherein the recovered dilute stable magnesia hydrosol contains methanol which is removed to produce a more concentrated stable magnesia hydrosol of about 4% magnesia content by weight.

3. A process for producing magnesia hydrosol containing about 3% by weight of magnesia which comprises discharging an anhydrous methanol solution of magnesium methylate as a stream into an excess of water in a mixing zone to hydrolyze the magnesium methylate while violently agitating the contents of said mixing zone to produce a dilute stable magnesia hydrosol substantially free of discrete particles of precipitated magnesia and containing at least about 3% by weight of magnesia and recovering said magnesia hydrosol.

4. A process according to claim 3 wherein the stirring is continued for about 20 minutes and the mixing is obtained by a propeller rotated at about 1050 R. P. M.

5. A process according to claim 3 wherein the magnesia hydrosol is allowed to set to a magnesia hydrogel.

6. A process according to claim 3 wherein the magnesia hydrosol is treated with a setting agent to form a magnesia hydrogel.

7. A process according to claim 6 wherein the setting agent comprises ammonia.

8. A process for producing magnesia hydrosol which comprises hydrolyzing an anhydrous methanol solution of magnesium methylate with an excess of water in a mixing zone by adding said methanol solution of magnesium methylate during the course of 20 minutes as a thin stream into an excess of water in said mixing zone while violently agitating the contents of said mixing zone to produce a dilute stable magnesia hydrosol substantially free of discrete particles of precipitated magnesia and containing about 3% by weight of magnesia and recovering said magnesia hydrosol.

References Cited in the file of this patent

UNITED STATES PATENTS

| Number | Name | Date |
| --- | --- | --- |
| 1,937,728 | Storch | Dec. 5, 1933 |
| 2,435,379 | Archibald | Feb. 3, 1948 |
| 2,450,394 | Brown et al. | Sept. 28, 1948 |
| 2,491,033 | Byrns et al. | Dec. 13, 1949 |

OTHER REFERENCES

Weiser, "The Hydrous Oxides," 1st Ed. 1926, pp. 164, 169. (Div. 59.)

Quinet, "Bull. Soc. Chem.," vol. 2, pp. 1201–5 (1935). (Sci. Lib.)

Whitmore, "Org. Chem.," 45th Ed. (1937), p. 105. (Copy in Div. 63.)